United States Patent [19]
Ohshita

[11] Patent Number: 5,490,012
[45] Date of Patent: Feb. 6, 1996

[54] UNDERWATER WIDE ANGLE ZOOM LENS

[75] Inventor: Koichi Ohshita, Tokyo, Japan

[73] Assignee: Nikon Corporation, Tokyo, Japan

[21] Appl. No.: 997,038

[22] Filed: Dec. 28, 1992

[30] Foreign Application Priority Data

Jan. 8, 1992 [JP] Japan ................................. 4-001358

[51] Int. Cl.$^6$ ................................................. G02B 15/14
[52] U.S. Cl. ............................................. 359/689; 359/684
[58] Field of Search .................................... 359/689, 684, 359/676, 683

[56] References Cited

U.S. PATENT DOCUMENTS 5,157,550 10/1992 Tsuchida et al. ..................... 359/689
5,325,236 6/1994 Tanaka ................................ 359/689

FOREIGN PATENT DOCUMENTS 59-13210 1/1984 Japan .
64-31113 2/1989 Japan .

Primary Examiner—Scott J. Sugarman
Attorney, Agent, or Firm—Shapiro and Shapiro

[57] ABSTRACT

A zoom lens has, in succession from the object side, a first lens unit G1 having an object side surface for contact with water and having a meniscus shape having its convex surface facing the object side and having negative refracting power, a second lens unit G2 having at least two negative lenses and a positive meniscus lens having its convex surface facing the object side and having negative refracting power as a whole, and a third lens unit G3 having at least two positive lenses, a negative lens and two positive lenses disposed on the image side thereof and having positive refracting power as a whole. The first lens unit G1 is fixed relative to the image plane, the second lens unit G2 is moved from the object side toward the image side and the third lens unit G3 is moved from the image side toward the object side to thereby vary the focal length from the wide angle to the telephoto.

86 Claims, 3 Drawing Sheets

UNDERWATER WIDE ANGLE ZOOM LENS

BACKGROUND OF THE INVENTION

1. Field of the Invention

This invention relates to an objective lens suitable for use in liquid such as water, and particularly to a photo-taking lens for an underwater single-lens reflex camera.

2. Related Background Art

In recent years, the number of people who attempt to take underwater photographs have been increasing with an increase in diving population. In order to meet this demand, cameras for underwater photographing and waterproof housings for enabling ordinary cameras to be used underwater are being studied.

It is usual that a photo-taking lens designed for exclusive use for underwater photographing is mounted on or contained in a camera exclusively for underwater photographing, and lenses therefor are known, for example, from applicant's Japanese Laid-Open Patent Application No. 59-13210 and Japanese Laid-Open Patent Application No. 64-31113. These lenses are designed to display their highest performances underwater and therefore, high descriptive power can be expected of them in underwater photographing.

On the other hand, a method of putting an ordinary camera into a waterproof housing and taking underwater photographs has the merit of being capable of intactly using an ordinary photo-taking lens (a photo-taking lens designed for use in the air), but this is a kind of expedient and therefore has been very unsatisfactory in convenience of use as well as in performance.

Now, the recent studies of zoom lenses for still cameras have produced excellent results in downsizing, widening of angle, heightening of magnification and reduction of cost. The recent compact and light-weight zoom lenses which have swept away the image of the former zoom lenses which have been large and heavy and unsatisfactory in performance have rapidly infiltrated into users from their convenience and have been popularized. There is even the impression that this explosive spread of zoom lenses has reduced conventional single-focus lenses to "special lenses" for use by some high-level users.

However, turning out attention to lenses for underwater photographing, single-focus lenses are still the mainstream and there has been no zoom lens for underwater photographing. A greater potential demand is expected of underwater zoom lenses than of ordinary lenses for use in the air. Yet underwater zoom lenses have scarcely been studied.

Of course, according to the afore described waterproof housings, it is possible that zoom lenses for use in the air are used under water. However, this poses a more serious problem than the use of single-focus lenses, as will hereinafter be described.

In a waterproof housing, there are two kinds of so-called ports attached to the front of a photo-taking lens and serving as a water-resisting window, i.e., a plane port comprised of a plane parallel plate and a dome port comprised of a lens substantially concentric with the entrance pupil of the photo-taking lens. However, if an underwater photograph is taken by the plane port, the occurrence of great positive distortion and chromatic difference of magnification is unavoidable in principle. On the other hand, when the dome port is resorted to, distortion and chromatic difference of magnification do not occur, yet great positive curvature of image field occurs in conformity with the curvature of the concentric lens. Further, the dome port has refracting power conforming to the curvature thereof and therefore, when it is combined with a zoom lens, great focus movement may occur due to a variation in the focal length of the zoom lens. To decrease such focus movement and curvature of image field, the curvature of the dome port can be weakened, but if it is done, the waterproof housing will unavoidably become impractically bulky.

SUMMARY OF THE INVENTION

The present invention has as its object the provision of a high-performance lens for underwater photographing which can achieve an angle of view as wide as 80° at the wide angle end and the brightness of F number 2.8.

The present invention as its basic construction is a zoom lens having, in succession from the object side, a first lens unit G1 having an object side surface for contact with water and having a meniscus shape having its convex surface facing the object side and having negative refracting power, a second lens unit G2 having at least two negative lenses and a positive meniscus lens disposed on the image side thereof and having its convex surface facing the object side and having negative refracting power as a whole, and a third lens unit G3 having at least two positive lenses, a negative lens disposed on the image side thereof and two positive lenses disposed on the image side thereof and having positive refracting power as a whole, said first lens unit G1 being fixed relative to the image plane, said second lens unit G2 being movable from the object side toward the image side and said third lens unit G3 being movable from the image side toward the object side to thereby vary the focal length from the wide angle to the telephoto. Preferably, the zoom lens satisfies the following conditions so as to correct aberrations:

$$0.05 < fW/r1a < 0.2 \tag{1}$$

$$-2.3 < f2/fW < -1.8 \tag{2}$$

$$1.7 < f3/fW < 1.9 \tag{3}$$

$$1.5 < \Sigma d3/fW < 1.8 \tag{4}$$

where fW: the rear side focal length of the entire system when the object side medium is water;

r1a: the radius of curvature of the image side surface of that lens of the first lens unit which is most adjacent to the object side;

f2: the focal length of the second lens unit;

f3: the focal length of the third lens unit;

$\Sigma d3$: the on-axis thickness of the third lens unit.

As shown in the lens construction view of FIG. 1 of the accompanying drawings, the present invention basically is of a three-unit construction having a first fixed lens unit G1 of negative refracting power serving also as a water-resisting window, a movable second lens unit G2 of negative refracting power and a movable third lens unit G3 of positive refracting power.

The first lens unit G1 has the function as a water-resisting window for preventing the entry of water into the lens, and the function of transmitting a light beam to the second and third lens units G2 and G3 while suppressing the occurrence of aberrations. From the requirement for waterproofing, the first lens unit G1 is fixed relative to the image plane and has a meniscus shape convex to the object side to minimize various aberrations occurring in the first lens unit G1.

The second lens unit G2 is a so-called compensator, which is movable so as to suppress the fluctuation of the focus position caused by the third lens unit G3. Further, the second lens unit G2 also bears the role of weakening the angle at which an off-axis light beam is incident on the third lens unit G3 by the action of the negative refracting power of the second lens unit G2 and effectively correcting astigmatism. However, the negative refracting action of the second lens unit G2 could at the same time become a potential factor of the occurrence of negative distortion at the wide angle end and is liable to cause over-correction of spherical aberration at the telephoto end. So, in the present invention, the second lens unit G2 is made into a construction having a convex negative meniscus lens at least on the object side and further, another negative lens and a positive meniscus lens having its convex surface facing the object side on the image side thereof. That is, the negative refracting power is lotted to two or more negative lenses, and the negative lens located on the object side is made into a meniscus shape to thereby minimize the occurrence of distortion. Further, a positive lens is disposed most adjacent to the image side in the second lens unit G2, thereby negating aberrations occurring in the negative lenses and making the correction of coma and spherical aberration at the telephoto end good.

The third lens unit G3 contributes to imaging as the only positive lens unit and further, has the role of varying the focal length of the entire system by the movement of its own. The third lens unit G3 requires at least one negative lens in order to render Petzval sum into a good value and correct spherical aberration. The third lens unit is made into a construction having, on the object side thereof, at least two positive lenses for the good correction of the spherical aberration, and on the image side of the negative lens, two positive lenses in order to secure a necessary back focal length and yet achieve good correction of coma.

Further, if a construction which satisfies the above-mentioned four conditions is adopted, good aberration correction will be attained, and this is preferable. The conditions will hereinafter be described.

Conditional expression (1) prescribes the radius of curvature of the image side surface of the first lens unit G1 to thereby determine the focal length of the first lens unit G1 at the same time, and aims at the downsizing of the entire system and good correction of distortion and chromatic difference of magnification. The object side surface of the first lens unit G1 is in contact with water, and since the difference in refractive index between water and the glass material of the first lens unit G1 is relatively small, the refracting power of the first lens unit G1 is considered to be prescribed by the image side surface thereof. If the lower limit of this conditional expression is exceeded, the radius of curvature of the image side surface of the first lens unit G1 will be too great and therefore, the correction of positive distortion and chromatic difference of magnification will be difficult and further, an increase in the effective diameter of the first lens unit G1 will be necessarily caused because the negative refracting action of the first lens unit G1 is small. If conversely, the upper limit of conditional expression (1) is exceeded, the downsizing of the diameter of the front lens can be achieved, but the negative refracting action of the first lens unit G1 will be two great and therefore, the correction of negative distortion at the wide angle end will become difficult, and for the correction thereof, an increase in the lens construction of the second lens unit G2 and subsequent lens unit will be brought about.

Conditional expression (2) prescribes the focal length of the second lens unit G2. The lens of the present invention is of a zoom type in which a negative fixed unit is disposed on the object side of the second lens unit G2 and therefore, for example, as compared with the refracting power of the first lens unit G1 of the conventional negative positive two-unit zoom lens, the negative refracting power of the second lens unit G2 can be kept relatively weak and yet a necessary back focal length and zoom spacing can be secured. If the upper limit of this conditional expression is exceeded, the negative refracting power of the second lens unit G2 will be two strong and therefore, the correction of negative distortion at the wide angle end and the correction of coma at the telephoto end will fail. Also, if the lower limit of this conditional expression is exceeded, the negative refracting power of the second lens unit G2 will be too weak and therefore, it will be difficult to secure a necessary back focal length and further, the amount of movement of the second lens unit G2 will be increased, thus resulting in the bulkiness of the system. If the above-described two conditions are satisfied, the zoom locus of the second lens unit G2 from the wide angle end to the telephoto end will move from the object side to the image side so as to negate the fluctuation of the entrance pupil caused by the third lens unit G3 being moved from the image side toward the object side and therefore, the fluctuations of aberrations occurring in the first lens unit G1 can be minimized, and this is very preferable.

Conditional expression (3) prescribes the focal length of the third lens unit G3. If the upper limit of this conditional expression is exceeded, the bulkiness of the system will result and the correction of the Petzval sum of the entire system will become difficult. If conversely, the lower limit of this conditional expression is exceeded, it will become difficult to secure a necessary back focal length and zoom spacing, and this is not preferable.

Conditional expression (4) defines the total thickness of the third lens unit G3. The lens of the present invention, as a zoom lens, aims at a great relative aperture and therefore, for the correction of various aberrations, particularly, coma and astigmatism, it is required to make the thickness of the third lens unit G3 on the optical axis thereof great. However, if the thickness of the third lens unit G3 on the optical axis thereof becomes great, the back focal length will become short or a necessary zoom ratio cannot be secured, and this is not preferable. Accordingly, if the upper limit of conditional expression (4) is exceeded, it will be difficult to secure a necessary back focal length, and if the lower limit of this conditional expression is exceeded, the correction of coma and astigmatism will be come difficult.

In the construction of the present invention as described above, it is desirable that the following conditions be further satisfied in point of mechanism and for better correction of aberrations:

$$0.5 < d1/fW < 1.2 \tag{5}$$

$$1.5 < n1 < 1.6 \tag{6}$$

$$1.7 < r2a/r2b < 2.4 \tag{7}$$

$$1.8 < d2c/d2d < 2.8 \tag{8}$$

$$0.9 < f3a/f3b < 1.2 \tag{9}$$

$$-0.8 < r3c/r3d < -0.5 \tag{10}$$

$$-1.0 \leq r3e/r3f < -0.6 \tag{11}$$

$$-0.2 < r3h/r3g < 0 \tag{12}$$

$$1.6 < n3a < n3b < 1.8 \tag{13}$$

where
- fW: the rear side focal length of the entire system when the object side medium is water;
- d1: the on-axis thickness of that lens in the first lens unit G1 which is most adjacent to the object side;
- n1: the refractive index of that lens in the first lens unit G1 which is most adjacent to the object side for d line (wavelength 587.6 nm);
- r2a: the radius of curvature of the object side surface of the negative lens in the second lens unit G2 which is located most adjacent to the object side;
- r2b: the radius of curvature of the image side surface of the negative lens in the second lens unit G2 which is located most adjacent to the object side;
- d2c: the on-axis air gap between the image side surface of the negative lens in the second lens unit G2 which is located most adjacent to the object side and the object side surface of the lens located on the image side of that negative lens;
- d2d: the on-axis air gap between the object side surface of the positive meniscus lens in the second lens unit G2 which is located most adjacent to the image side and the image side surface of the lens disposed on the object side of that positive lens;
- f3a: the focal length of the positive lens unit disposed more adjacent to the object side than the negative lens in the third lens unit G3;
- f3b: the focal length of the positive lens unit disposed more adjacent to the image side than the negative lens in the third lens unit G3;
- r3c: the radius of curvature of the object side surface of the positive lens in the third lens unit G3 which is disposed most adjacent to the object side;
- r3d: the radius of curvature of the image side surface of the positive lens in the third lens unit G3 which is disposed most adjacent to the object side;
- r3e: the radius of curvature of the object side surface of the negative lens in the third lens unit G3;
- r3f: the radius of curvature of the image side surface of the negative lens in the third lens unit G3;
- r3g: the radius of curvature of the object side surface of the positive lens in the third lens unit G3 which is disposed most adjacent to the image side;
- r3h: the radius of curvature of the image side surface of the positive lens in the third lens unit G3 which is disposed most adjacent to the image side;
- n3a: the average refractive index of the positive lenses in the lens group which is disposed more adjacent to the object side than the negative lens in the third lens unit G3;
- n3b: the average refractive index of the positive lenses in the lens group which is disposed more adjacent to the image side than the negative lens in the third lens unit G3.

Conditional expression (5) prescribes the on-axis thickness of the first lens unit G1. If the lower limit of this conditional expression is exceeded, the on-axis thickness of the first lens unit G1 will be two small and a problem will arise in the water pressure resistance as an underwater lens. If the upper limit of this conditional expression is exceeded, the on-axis thickness of the first lens unit G1 will be greater than necessary and this will be a hindrance to the downsizing of the lens system.

Conditional expression (6) prescribes the refractive index of that lens constituting the first lens unit G1 which is most adjacent to the object side. The refractive index of water is of the order of 1.33 for d line, but if the refractive index of that lens which is most adjacent to the object side and which is in contact with water is too far a value, high-order aberrations could occur from the difference in refractive index. Also, glass materials of too high refractive index are generally expensive, and materials of low refractive index are soft like fluorite, plastics, etc. and are poor in chemical and mechanical resistance. Accordingly, if the upper limit of this condition is exceeded, the refractive index of that lens which is most adjacent to the object side will be high and the problems of the occurrence of high-order aberrations and the increased cost of the glass material will arise, and this is not preferable. Also, if the lower limit of this condition is exceeded, there will arise a problem in the chemical and mechanical resistance of that lens which is most adjacent to the object side.

Conditional expression (7) defines the shape of the negative meniscus lens in the second lens unit G2 which is located most adjacent to the object side. If the upper limit of this conditional expression is exceeded, the negative action of this lens will strengthen and therefore, the correction of negative distortion at the wide angle end will become difficult, and if conversely, the lower limit of this conditional expression is exceeded, the curvatures of the respective surfaces will become too sharp and therefore, the correction of coma will become difficult.

Conditional expression (8) defines the ratio of air gap in the second lens unit G2 to thereby intend the securement of the quantity of marginal light and the good correction of the lower coma at the wide angle end. If the upper limit of this conditional expression is exceeded, the air gap between the positive meniscus lens in the second lens unit G2 which is located most adjacent to the image side and the lens on the object side thereof will narrow and therefore, high-order aberrations will be liable to occur and good correction of the lower coma particularly at the wide angle end cannot be expected. If conversely, the lower limit of this conditional expression is exceeded, the air gap between the negative meniscus lens located most adjacent to the object side and the lens on the image side thereof will narrow and therefore, these two lenses will mechanically interfere with each other and the securement of the quantity of marginal light will become difficult.

Conditional expression (9) prescribes the distribution of refracting power in the third lens unit G3. The third lens unit G3 basically is a so-called triplet lens comprising positive, negative and positive lenses, and for better correction of aberrations, the object side and image side positive lenses each are constructed by being divided into at least two positive lenses. Conditional expression (9) prescribes the distribution of refracting power to those object side and image side positive lens groups. If the upper limit of this conditional expression is exceeded, the refracting power of the object side positive lens group will be weak and this is advantageous for the securement of the back focal length at the wide angle end, but the air gap between the second lens unit G2 and the third lens unit G3 at the telephoto end will narrow and therefore, a great zoom ratio will not be realized and also, the correction of distortion and asymmetrical aberrations occurring in the second lens unit G2 will become difficult. If conversely, the lower limit of this conditional expression is exceeded, the refracting power of the image side positive lens group will be too weak and therefore, the securement of the back focal length at the wide angle end will be difficult and astigmatic difference and high-order coma at a maximum angle of view will be liable to increase.

Conditional expression (10) prescribes the shape of the positive lens in the third lens unit G3 which is most adjacent to the object side. The shape of this positive lens plays an important role in the correction of spherical aberration and therefore, is particularly important in case of a lens of great aperture like the lens of the present invention. If the lower limit of this conditional expression is exceeded, it will be advantageous for the correction of spherical aberration at the telephoto end, but astigmatic difference at a maximum angle of view will increase, and if the upper limit of this conditional expression is exceeded, good correction of spherical aberration will become difficult.

Conditional expression (11) is for prescribing the shape of the negative lens in the third lens unit G3 to thereby achieve good correction of particularly upper coma. Particularly the radius of curvature of the image side surface of this negative lens is important for the correction of upper coma, and if this radius of curvature is too small, it is liable to cause high-order extroversive coma. The lens of the present invention, as compared with the prior-art two-unit zoom lens for use in the air, makes this radius of curvature great to thereby make the correction of upper coma good. If the lower limit of this conditional expression is exceeded, upper coma will be difficult to correct well, and if the upper limit of this conditional expression is exceeded, good correction of spherical aberration cannot be expected.

Conditional expression (12) is concerned with the shape of the positive lens in the third lens unit G3 which is most adjacent to the image side. If the upper limit of this conditional expression is exceeded, spherical aberration will become under-corrected, and if the lower limit of this conditional expression is exceeded, the correction of astigmatism will become difficult.

Conditional expression (13) prescribes the refractive indices of the object side and image side positive lens groups in the third lens unit G3. In case of the great aperture lens of the present invention, higher refractive indices of the positive lenses are more advantageous, but it is liable to be contradictory to the correction of Petzval sum. So, in case of the present invention, the refractive index of the object side positive lens is made low as compared with that of the image side positive lens, whereby the above-noted problem is solved. The upper limit of this conditional expression is defined by the limit of the correction of Petzval sum, and the lower limit of this conditional expression is defined by the limit of the correction of spherical aberration.

In the above-described construction, it is preferable that the following conditional expression be satisfied:

$$1 < |x_2/x_3| < 1.5, \qquad (14)$$

where $x_2$: the amount by which the second lens unit is moved when the focal length of the entire system varies from the shortest one to the longest one;

$x_3$: the amount by which the third lens unit is moved when the focal length of the entire system varies from the wide angle end to the telephoto end.

Conditional expression (14) prescribes the ratio of the amounts of movement of the second lens unit G2 and the third lens unit G3. If the upper limit of this conditional expression is exceeded, the second lens unit will become weak in negative refracting power and therefore, the amount of movement of the second lens unit G2 will become great. As a result, it will be difficult to secure a necessary back focal length and further, the entire system will become bulky, and this is not preferable. Also, since the amount of movement of the second lens unit will be great, the height of the off-axis ray passing through the second lens unit at the wide angle end and the telephoto end will greatly vary and this, it will become difficult to suppress the fluctuations of off-axis aberrations at the wide angle end and the telephoto end. If conversely, the lower limit of this conditional expression is exceeded, the negative refracting power of the second lens unit G2 will become strong and therefore, the correction of distortion at the wide angle end and spherical aberration at the telephoto end will become difficult. Since Petzval sum will become negative, the correction of curvature of image field will also become difficult.

DETAILED DESCRIPTION OF THE PREFERRED EMBODIMENTS

Figure 1:
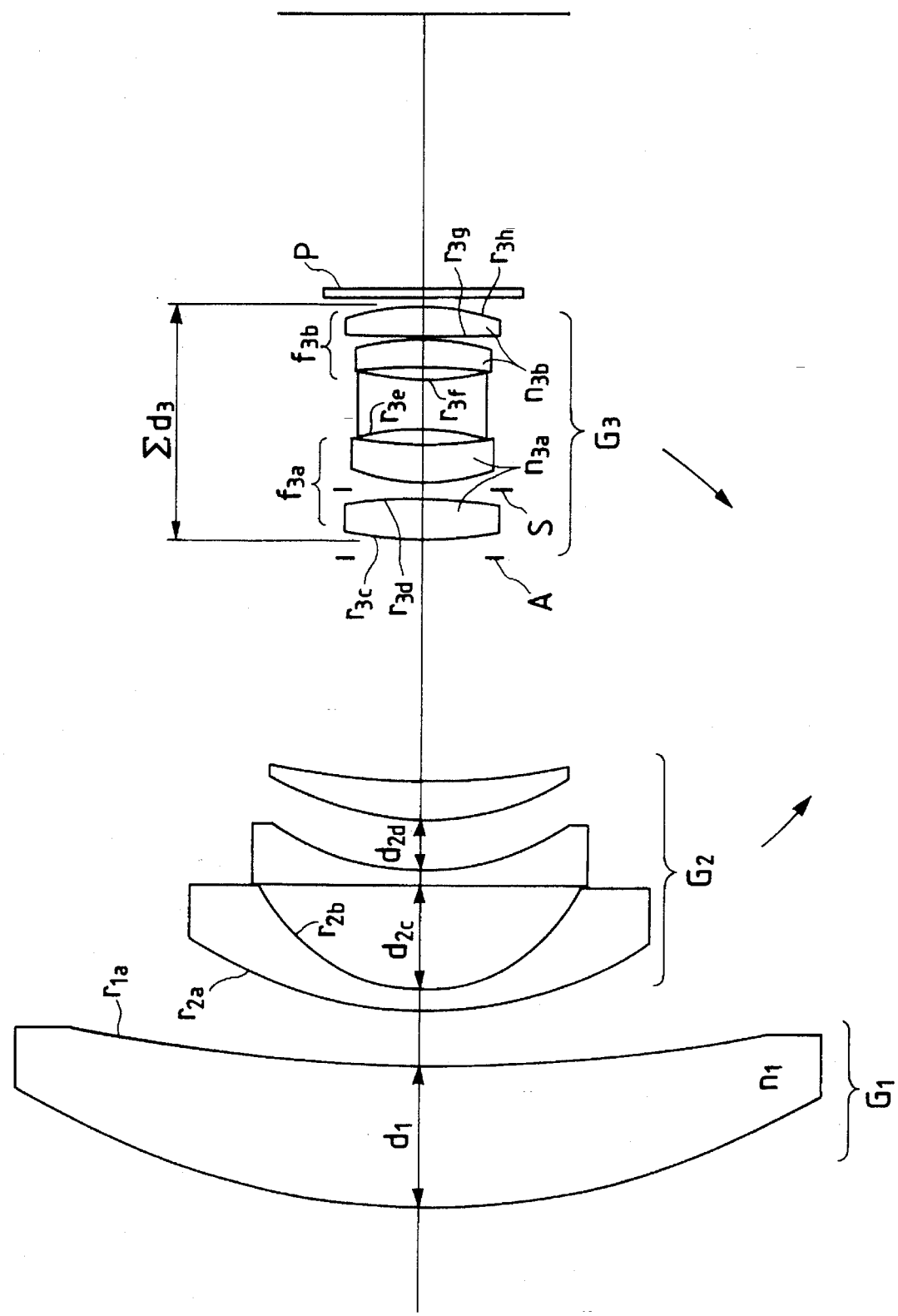
FIG. 1 shows the lens construction of a zoom lens according to a first embodiment of the present invention.

Some embodiments of the present invention will hereinafter be described. A first embodiment of the present invention, as shown in FIG. 1, has, in succession from the object side, a first lens unit G1 having negative refracting power under water, a second lens unit G2 of negative refracting power and a third lens unit G3 of positive refracting power. The first lens unit G1 comprises a single lens of positive meniscus shape having its convex surface facing the object side, and the second lens unit G2 is comprised of a negative meniscus lens having its convex surface facing the object side, a negative lens having its surface of sharper curvature facing the image side, and a positive meniscus lens having its convex surface facing the object side. The third lens unit G3 comprises, in succession from the object side, a biconvex positive lens, a positive meniscus lens having its convex surface facing the object side, a biconcave negative lens, a positive meniscus lens having its convex surface facing the image side, and a positive meniscus lens having its convex surface facing the image side. A stop A located on the object side of the third lens unit G3 is constant in aperture. This stop A is effective to secure a land light beam at the telephoto end and yet cut a light beam which becomes the harmful component of the off-axis light beam at the wide angle end. An aperture stop S is disposed between the two object side positive lenses in the third lens unit G3, and a plane parallel plate P is disposed as a dustproof cover on the image side of the third lens unit G3.

Figure 2:
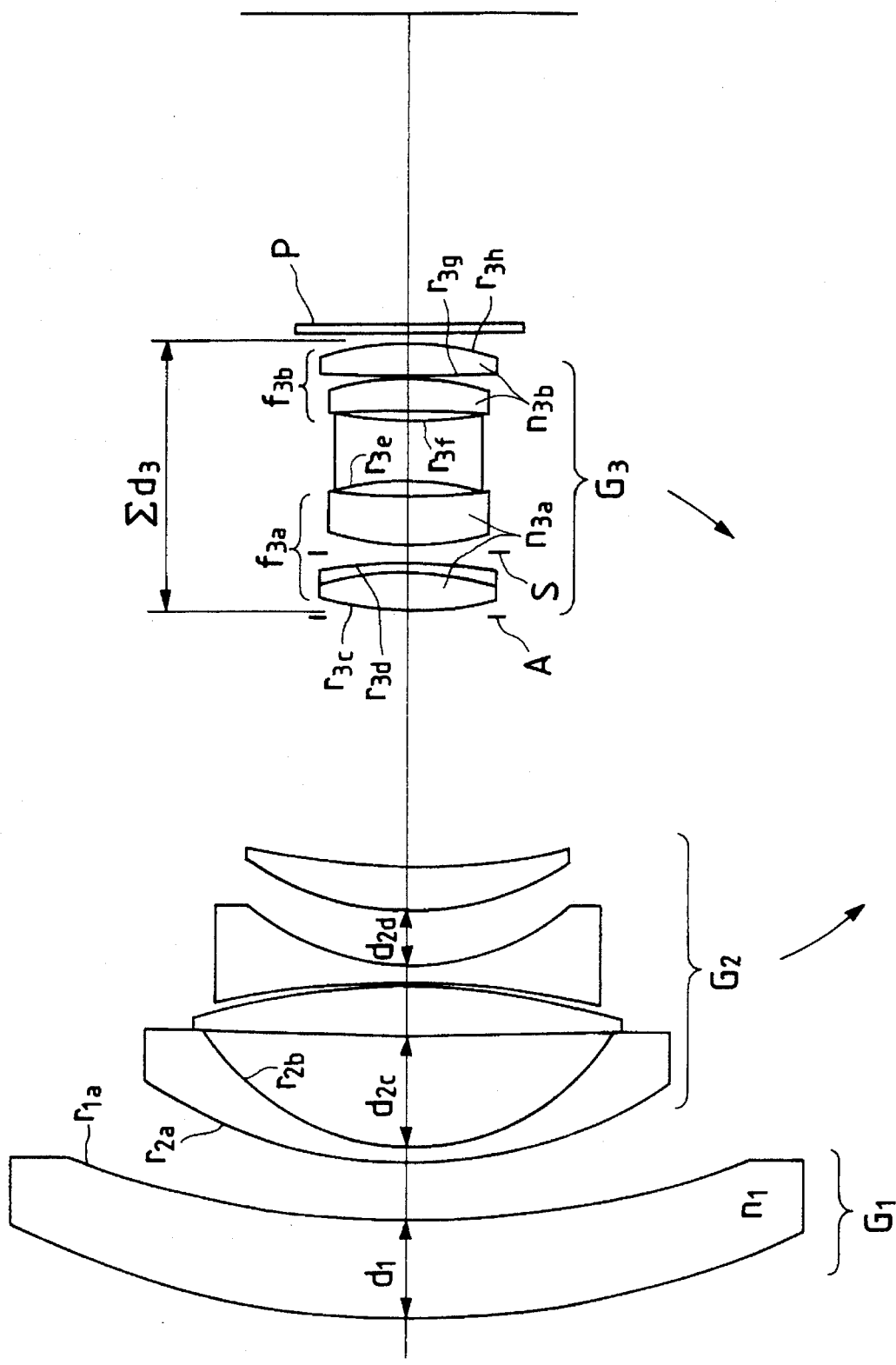
FIG. 2 shows the lens construction of a zoom lens according to a second embodiment of the present invention.

A second embodiment of the present invention, as shown in the lens construction view of FIG. 2, has a positive lens added to the second lens unit G2. The second lens unit G2 comprises, in succession from the object side, a negative meniscus lens having its convex surface facing the object side, a positive lens having its surface of sharper curvature facing the image side, a negative lens having its surface of sharper curvature facing the image side, and a positive meniscus lens having its convex surface facing the object side. The positive lens in the third lens unit G3 which is most adjacent to the object side is comprised of a cemented lens.

Figure 3:
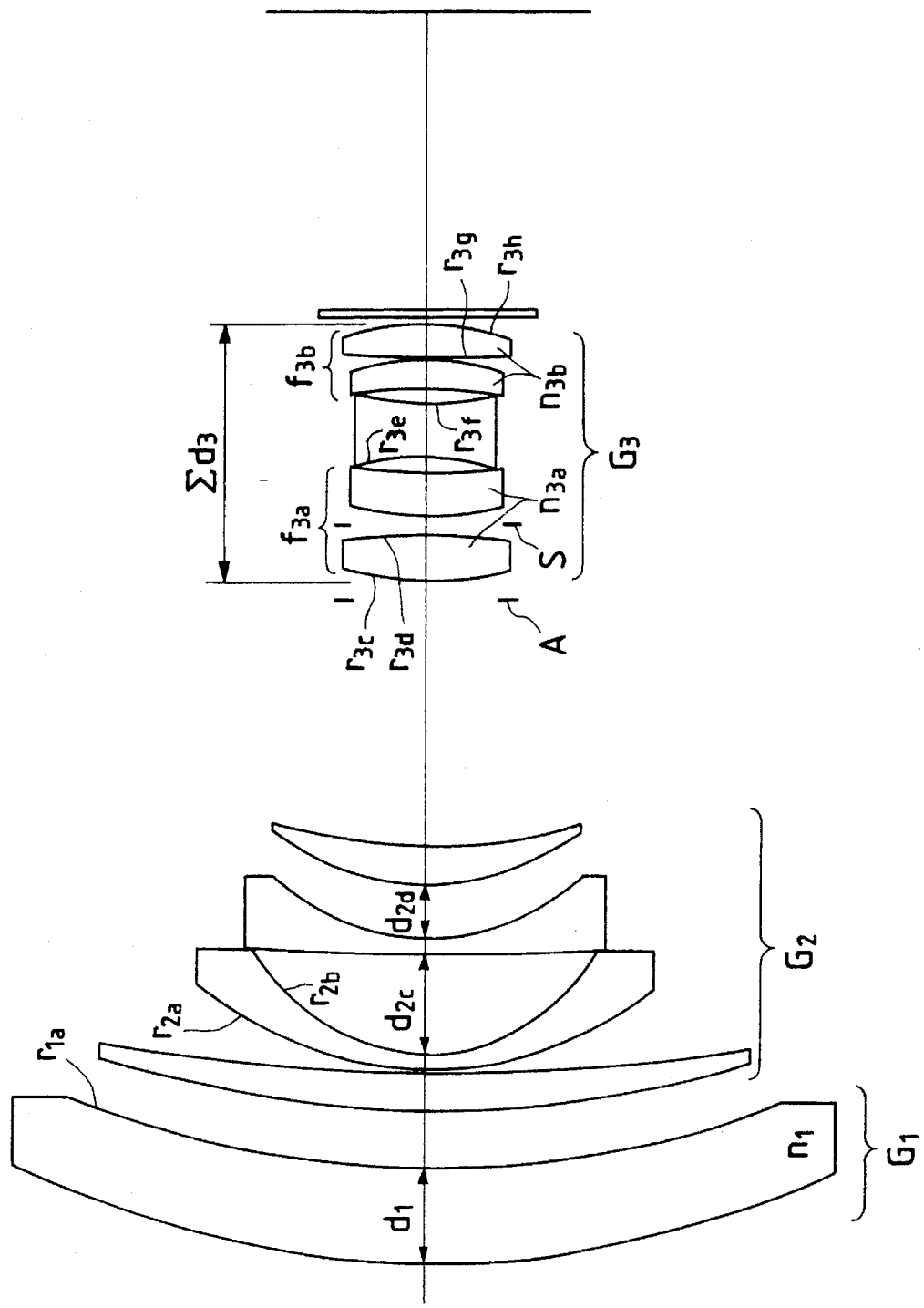
FIG. 3 shows the lens construction of a zoom lens according to a third embodiment of the present invention.

A third embodiment of the present invention, as shown in FIG. 3, is of a construction in which a positive lens is added to the second lens unit G2. The second lens unit G2 comprises, in succession from the object side, a positive meniscus lens having its convex surface facing the object side, a negative meniscus lens having its convex surface facing the object side, a negative lens having its surface of sharper curvature facing the image side, and a positive meniscus lens having its convex surface facing the object side. Each embodiment is a zoom lens covering a focal length of 20 mm–35 mm and an angle of view as wide as 80°–50° as a lens for a 35 mm format camera, and has the brightness of F number 2.8.

The numerical data of the respective embodiments of the present invention will be shown in tables below. In each table, the numbers at the left end represent surface numbers, r represents the radius of curvature, d represents the spacing between adjacent surfaces, Abbe represents the Abbe number, n represents the refractive index for d line ($\lambda$= 587.6 nm), f represents the focal length, Bf represents the back focal length, FN represents F number, and $2\omega$ represents the angle of view. The refractive index of water is n=1.33306, and the Abbe number of water is 54.0. The plane parallel plate in each lens which is most adjacent to the image side is a dustproof and drip-proof cover and is functionally effective to secure reliability in a single piece as an underwater lens.

TABLE 1

(Numerical data of the Zoom Lens of the First Embodiment)
f = 20.60 ~ 34.00 Bf = 38.56 FN = 2.88
$2\omega$ = 79.8° ~ 51.4°

|  | r | d | Abbe | n |
|---|---|---|---|---|
| 1 | 111.600 | 20.00 | 64.1 | 1.51680 |
| 2 | 255.080 | (d2) | | |
| 3 | 60.230 | 3.00 | 45.4 | 1.79668 |
| 4 | 26.230 | 15.00 | | |
| 5 | 2180.836 | 2.00 | 49.4 | 1.77279 |
| 6 | 38.846 | 7.00 | | |
| 7 | 40.565 | 5.60 | 29.5 | 1.71736 |
| 8 | 0.316 | (d8) | | |
| 9 | 49.471 | 6.00 | 42.0 | 1.66755 |
| 10 | −69.274 | 2.20 | | |
| 11 | 9.429 | 5.50 | 60.2 | 1.62041 |
| 12 | 0.582 | 2.00 | | |
| 13 | −35.200 | 7.00 | 25.4 | 1.80518 |
| 14 | 7.948 | 1.70 | | |
| 15 | −85.856 | 4.00 | 55.6 | 1.69680 |
| 16 | −37.179 | 40 | | |
| 17 | 327.070 | 4.30 | 52.3 | 1.74810 |
| 18 | −33.237 | (d18) | | |
| 19 | ∞ | 1.30 | 64.1 | 1.51680 |
| 20 | ∞ | 38.56 | | |
| F | 20.6007 | 26.5009 | 34.0012 | |
| d2 | 7.9672 | 18.9022 | 24.4123 | |
| d8 | 34.1678 | 17.6102 | 4.9839 | |
| d18 | 1.1021 | 6.7247 | 13.8409 | |
| d20 | 38.5630 | 38.5630 | 38.5630 | |

TABLE 2

(Numerical Data of the Zoom Lens of the Second Embodiment)
f = 20.60 ~ 34.00 Bf = 38.75 FN = 2.88
$2\omega$ = 80.6° ~ 51.8°

|  | r | d | Abbe | n |
|---|---|---|---|---|
| 1 | 120.000 | 12.00 | 64.1 | 1.51680 |
| 2 | 126.649 | (d2) | | |
| 3 | 61.371 | 2.00 | 43.3 | 1.84042 |
| 4 | 31.549 | 13.60 | | |

TABLE 2-continued (Numerical Data of the Zoom Lens of the Second Embodiment)
f = 20.60 ~ 34.00 Bf = 38.75 FN = 2.88
$2\omega$ = 80.6° ~ 51.8°

|  | r | d | Abbe | n |
|---|---|---|---|---|
| 5 | 484.524 | 6.40 | 50.3 | 1.72000 |
| 6 | −92.177 | .40 | | |
| 7 | −110.435 | 2.00 | 49.4 | 1.77279 |
| 8 | 2.589 | 6.80 | | |
| 9 | 37.334 | 5.40 | 28.3 | 1.72825 |
| 10 | 8.215 | (d10) | | |
| 11 | 42.284 | 5.00 | 45.1 | 1.74400 |
| 12 | −37.228 | 1.00 | 35.8 | 1.90265 |
| 13 | −70.505 | 2.20 | | |
| 14 | 36.904 | 6.00 | 28.3 | 1.72825 |
| 15 | 64.592 | 2.10 | | |
| 16 | −30.514 | 7.00 | 23.0 | 1.86074 |
| 17 | 45.292 | 1.40 | | |
| 18 | −105.278 | 4.20 | 48.1 | 1.71700 |
| 19 | −33.503 | .30 | | |
| 20 | 540.660 | 4.20 | 49.4 | 1.77279 |
| 21 | −34.405 | (d21) | | |
| 22 | ∞ | 1.00 | 64.1 | 1.51680 |
| 23 | ∞ | 38.75 | | |
| F | 20.6000 | 26.5000 | 34.0001 | |
| d2 | 7.2426 | 18.5556 | 23.4851 | |
| d10 | 32.2119 | 14.6886 | 2.1326 | |
| d21 | 1.0000 | 7.2103 | 14.8367 | |
| d23 | 38.7500 | 38.7500 | 38.7500 | |

TABLE 3

(Numerical Data of the Zoom Lens of the Third Embodiment)
f = 20.60 ~ 34.00 Bf = 38.76 FN = 2.88
$2\omega$ = 79.6° ~ 51.4°

|  | r | d | Abbe | n |
|---|---|---|---|---|
| 1 | 126.395 | 12.00 | 64.1 | 1.51680 |
| 2 | 129.210 | (d2) | | |
| 3 | 140.323 | 5.00 | 57.0 | 1.62280 |
| 4 | 259.688 | .40 | | |
| 5 | 47.719 | 2.00 | 45.4 | 1.79668 |
| 6 | 26.400 | 13.00 | | |
| 7 | 440.000 | 2.00 | 45.4 | 1.79668 |
| 8 | 30.502 | 7.00 | | |
| 9 | 34.225 | 5.00 | 28.3 | 1.72825 |
| 10 | 73.604 | (d10) | | |
| 11 | 41.123 | 6.00 | 42.0 | 1.66755 |
| 12 | −78.690 | 2.20 | | |
| 13 | 35.572 | 6.00 | 47.1 | 1.67003 |
| 14 | 91.533 | 1.90 | | |
| 15 | −30.918 | 7.00 | 23.0 | 1.86074 |
| 16 | 44.644 | 1.60 | | |
| 17 | −70.783 | 4.00 | 45.1 | 1.74400 |
| 18 | −32.346 | .30 | | |
| 19 | 240.020 | 4.20 | 46.8 | 1.76684 |
| 20 | −34.785 | (d20) | | |
| 21 | ∞ | 1.00 | 64.1 | 1.51680 |
| 22 | ∞ | 38.76 | | |
| F | 20.6000 | 26.5000 | 34.0001 | |
| d2 | 7.3790 | 18.2817 | 22.9688 | |
| d10 | 33.8201 | 16.7588 | 4.5022 | |
| d20 | 1.0000 | 7.1585 | 14.7278 | |
| d22 | 38.7614 | 38.7614 | 38.7615 | |

In Table 4 below, the corresponding values of the conditional expressions (1)–(14), and also (15) according to the present invention are shown with respect to the above-described respective embodiments.

TABLE

| | 1st Embodiment | 2nd Embodiment | 3rd Embodiment |
|---|---|---|---|
| (1) fW/r1a | 0.081 | 0.163 | 0.159 |
| (2) f2/fW | −1.942 | −2.185 | −2.184 |
| (3) f3/fW | 1.828 | 1.820 | 1.796 |
| (4) Σd3/fW | 1.607 | 1.621 | 1.612 |
| (5) d1/fW | 0.970 | 0.583 | 0.583 |
| (6) n1 | 1.517 | 1.517 | 1.517 |
| (7) r2a/r2b | 2.296 | 1.945 | 1.808 |
| (8) d2c/d2d | 2.679 | 2.000 | 1.857 |
| (9) f3a/f3b | 1.012 | 1.099 | 1.068 |
| (10) r3c/r3d | −0.714 | −0.600 | −0.523 |
| (11) r3e/r3f | −0.928 | −0.675 | −0.693 |
| (12) r3h/r3g | −0.102 | −0.064 | −0.145 |
| (13) n3a | 1.644 | 1.736 | 1.669 |
| (13) n3b | 1.722 | 1.745 | 1.755 |
| (14) [$x_2/x_3$] | 1.291 | 1.174 | 1.136 |
| (15) fl/fw | −145.63 | −19.417 | −19.417 |

It is most preferable and can expect a high performance that the focusing of the zoom lens of the present invention be effected by the movement of the second lens unit G2, but of course, use may be made of other method such as moving the second lens unit G2 and the third lens unit G3 together. Also, the zoom lens of the present invention is the same as other ordinary wide angle zoom lenses in that an aspherical surface can be used in the second lens unit G2 to achieve better correction of distortion or an aspherical surface can be used in the third lens unit G3 to achieve better correction of spherical aberration.

What is claimed is:

1. A zoom lens comprising in the following order from the object side:

a first lens unit having negative refractive power and including a meniscus lens with a convex side facing the object side;

a second lens unit having negative refractive power; and a third lens unit having positive refractive power;

wherein said first lens unit is fixed relative to the image plane, and said second and third lens units are moved along an optical axis to thereby vary the rear side focal length, and wherein the zoom lens satisfies the following condition, $$0.05 < fw/r1a < 0.2,$$

where fw: the rear side focal length of the entire system under use;

r1a: the radius of curvature of the image side surface of that lens in the first lens unit which is most adjacent to the object side.

2. A zoom lens according to claim 1, further satisfying the following condition:

$$-2.3\ f2/fw < -1.8,$$

where f2: the focal length of the second lens unit.

3. A zoom lens according to claim 2, wherein said second lens unit is moved toward the object side to thereby effect focusing from infinity to a short distance object.

4. A zoom lens according to claim 3, further satisfying the following conditions:

$$1.7 < f3/fw < 1.9$$

$$1.5 < \Sigma d3/fw < 1.8,$$

where f3: the focal length of the third lens unit;

Σd3: the thickness of the third lens unit on the optical axis thereof.

5. A zoom lens comprising in the following order from the object side:

a first lens unit having negative refractive power and including a meniscus lens with a convex side facing the object side;

a second lens unit having negative refractive power; and a third lens unit having positive refractive power, wherein said first lens unit is fixed relative to the image plane, said second lens unit is moved from the object side toward the image side and said third lens unit is moved from the image side toward the object side to thereby vary the rear side focal length from the shortest one to the longest one, and wherein said zoom lens satisfies the following condition:

$$1 < |x2/x3| < 1.5,$$

where x2: the amount by which the second lens unit is moved when the focal length of the entire system varies from the shortest one to the longest one;

x3: the amount by which the third lens unit is moved when the focal length of the entire system varies from the shortest one to the longest one.

6. A zoom lens according to claim 5, further satisfying the following condition:

$$-2.3 < f2/fw < -1.8,$$

where f2: the focal length of the second lens unit;

fw: the rear side focal length of the entire system under use.

7. A zoom lens according to claim 6, wherein said second lens unit is moved toward the object side to thereby effect focusing from infinity to a short distance object.

8. A zoom lens according to claim 7, further satisfying the following conditions:

$$1.7 < f3/fw < 1.9$$

$$1.5 < \Sigma d3/fw < 1.8,$$

where f3: the focal length of the third lens unit;

Σd3: the thickness of the third lens unit on the optical axis thereof.

9. A zoom lens comprising in the following order from the object side:

a first lens unit having negative refractive power and including a meniscus lens with a convex side facing the object side;

a second lens unit having negative refractive power; and a third lens unit having positive refractive power, wherein said first lens unit is fixed relative to the image plane, and said second and third lens units are moved along an optical axis to thereby vary the rear side focal length, and wherein said zoom lens satisfies the following condition:

$$1.5 < \Sigma d3/fw < 1.8,$$

where fw: the rear side focal length of the entire system under use;

Σd3: the thickness of the third lens unit on the optical axis thereof.

10. A zoom lens according to claim 9, further satisfying the following condition:

$$-2.3 < f2/fw < -1.8,$$

where f2: the focal length of the second lens unit.

11. A zoom lens according to claim 10, wherein said second lens unit is moved toward the object side to thereby effect focusing from infinity to a short distance object.

12. A zoom lens according to claim 11, further satisfying the following condition:

$$1.7 < f3/fw < 1.9,$$

where f3: the focal length of the third lens unit.

13. A zoom lens according to claim 11, further satisfying the following condition:

$$0.05 < fw/r1a < 0.2,$$

where r1a: the radius of curvature of the image side surface of that lens in the first lens unit which is most adjacent to the object side.

14. A zoom lens comprising in the following order from the object side:

a first lens unit having negative refractive power and including a meniscus lens with a convex side facing the object side;

a second lens unit having negative refractive power; and a third lens unit having positive refractive power, wherein said first lens unit is fixed relative to the image plane, and said second and third lens units are moved along an optical axis to thereby vary the rear side focal length, and wherein the zoom lens satisfies the following condition:

$$1.7 < f3/fw < 1.9,$$

where f3: the focal length of the third lens unit;

fw: the rear side focal length of the entire system under use.

15. A zoom lens according to claim 14, further satisfying the following condition:

$$-2.3 < f2/fw < -1.8,$$

where f2: the focal length of the second lens unit.

16. A zoom lens according to claim 15, wherein said second lens unit is moved toward the object side to thereby effect focusing from infinity to a short distance object.

17. A zoom lens according to claim 16, further satisfying the following condition:

$$1.5 < \Sigma d3/fw < 1.8,$$

where

Σd3: the thickness of the third lens unit on the optical axis thereof.

18. A zoom lens according to claim 16, further satisfying the following condition:

$$0.05 < fw/r1a < 0.2,$$

where r1a: the radius of curvature of the image side surface of that lens in the first lens unit which is most adjacent to the object side.

19. An underwater zoom lens comprising in the following order from the object side:

a first lens unit having negative refractive power and including a meniscus lens with a convex side facing the object side, the lens surface of the first lens unit closest to the object side to be in contact with water;

a second lens unit having negative refractive power; and a third lens unit having positive refractive power;

wherein said first lens unit is fixed relative to the image plane so as to serve as a waterproof window, and said second and third lens units are moved along an optical axis to thereby vary the rear side focal length; and wherein said underwater zoom lens satisfies the following condition:

$$0.5 < d1/fw < 1.2,$$

where d1: the on-axis thickness of that lens in the first lens unit which is most adjacent to the object side;

fw: the rear side focal length of the entire system under use.

20. A zoom lens according to claim 19, further satisfying the following condition:

$$-2.3 < f2/fw < -1.8,$$

where f2: the focal length of the second lens unit.

21. A zoom lens according to claim 20, wherein said second lens unit is moved toward the object side to thereby effect focusing from infinity to a short distance object.

22. A zoom lens according to claim 21, further satisfying the following conditions:

$$0.05 < fw/r1a < 0.2$$

$$1.7 < f3/fw < 1.9$$

$$1.5 < \Sigma d3/fw < 1.8,$$

where r1a: the radius of curvature of the image side surface of that lens in the first lens unit which is most adjacent to the object side;

f3: the focal length of the third lens unit;

Σd3: the thickness of the third lens unit on the optical axis thereof.

23. A zoom lens according to claim 21, further satisfying the following condition:

$$0.05 < fw/r1a < 0.2,$$

where r1a: the radius of curvature of the image side surface of that lens in the first lens unit which is most adjacent to the object side.

24. A zoom lens according to claim 19, further satisfying the following condition:

$$1.5 < n1 < 1.6,$$

where n1: the refractive index of that lens in the first lens unit which is most adjacent to the object side for d-line.

25. A zoom lens according to claim 24, further satisfying the following condition:

$$-2.3 < f2/fw < -1.8,$$

where f2: the focal length of the second lens unit.

26. A zoom lens according to claim 25, wherein said second lens unit is moved toward the object side to thereby effect focusing from infinity to a short distance object.

27. A zoom lens according to claim 26, further satisfying the following conditions:

$$0.05 < fw/r1a < 0.2$$

$$1.7 < f3/fw < 1.9$$

$$1.5 < \Sigma d3/fw < 1.8,$$

where r1a: the radius of curvature of the image side surface of that lens in the first lens unit which is most adjacent to the object side;

f3: the focal length of the third lens unit;

Σd3: the thickness of the third lens unit on the optical axis thereof.

28. A zoom lens according to claim 19, satisfying the following condition:

$$-2.3 < f2/fw < -1.8,$$

where f2: the focal length of the second lens unit;

fw: the rear side focal length of the entire system under use.

29. A zoom lens comprising in the following order from the object side:

a first lens unit having negative refractive power and including a meniscus lens with a convex side facing the object side as the lens closest to the object side;

a second lens unit having negative refractive power and including a negative meniscus lens component with its convex side facing the object side, which is located closest to the object side, and a positive lens component which is located on the image side of the negative meniscus lens component; and a third lens unit having positive refractive power and including, in succession from the object side, two positive lens components, one negative lens component and two positive lens components;

wherein said first lens unit is fixed relative to the image plane, and said second and third lens units are moved along an optical axis to thereby vary the rear side focal length.

30. A zoom lens according to claim 29, satisfying the following condition:

$$1.7 < r2a/r2b < 2.4,$$

where r2a: the radius of curvature of the object side surface of the negative meniscus lens component in the second lens unit which is located closest to the object side, r2b: the radius of curvature of the image side surface of the negative meniscus lens component in the second lens unit which is located closest to the object side.

31. A zoom lens according to claim 30, wherein said second lens unit is moved toward the object side to thereby effect focusing from infinity to a short distance object.

32. A zoom lens according to claim 31, further satisfying the following condition:

$$0.05 < fw/r1a < 0.2,$$

where fw: the rear side focal length of the entire system under use;

r1a: the radius of curvature of the image side surface of that lens in the first lens unit which is most adjacent to the object side.

33. A zoom lens according to claim 32, further satisfying the following condition:

$$-2.3 < f2/fw < -1.8,$$

where f2: the focal length of the second lens unit.

34. A zoom lens according to claim 33, further satisfying the following condition:

$$1.5 < \Sigma d3/fw < 1.8,$$

where

Σd3: the thickness of the third lens unit on the optical axis thereof.

35. A zoom lens according to claim 33, further satisfying the following condition:

$$1.7 < f3/fw < 1.9,$$

where f3: the focal length of the third lens unit.

36. A zoom lens comprising in the following order from the object side:

a first lens unit having negative refractive power and including a meniscus lens with a convex side facing the object side as the lens closest to the object side;

a second lens unit having negative refractive power and including a negative meniscus lens component with its convex side facing the object side, which is located closest to the object side, and a positive lens component which is located on the image side of the negative meniscus lens component; and a third lens unit having positive refractive power and including, in succession from the object side, two positive lens components, one negative lens component and two positive lens components;

wherein said first lens unit is fixed relative to the image plane, and said second and third lens units are moved along an optical axis to thereby vary the rear side focal length, and wherein said zoom lens satisfies the following condition:

$$1.8 < d2c/d2d < 2.8,$$

where d2c: the on-axis air gap between the image side surface of the negative meniscus lens component in the second lens unit which is located closest to the object side and the object side surface of the lens component located on the image side of that negative meniscus lens component;

d2d: the on-axis air gap between the image side surface of the lens component in the second lens unit located on the object side of the positive lens component and the object side surface of the positive lens component.

37. A zoom lens according to claim 36 wherein, said second lens unit is moved toward the object side to thereby effect focusing from infinity to a short distance object.

38. A zoom lens according to claim 37, further satisfying the following condition:

$$0.05<fw/r1a<0.2,$$

where fw: the rear side focal length of the entire system under use:

r1a: the radius of curvature of the image side surface of that lens in the first lens unit which is most adjacent to the object side.

39. A zoom lens according to claim 38, further satisfying the following condition:

$$-2.3<f2/fw<-1.8,$$

where f2: the focal length of the second lens unit.

40. A zoom lens according to claim 39, further satisfying the following condition:

$$1.5<\Sigma d3/fw<1.8,$$

where $\Sigma d3$: the thickness of the third lens unit on the optical axis thereof.

41. A zoom lens according to claim 39, further satisfying the following condition:

$$1.7<f3/fw<1.9,$$

where f3: the focal length of the third lens unit.

42. A zoom lens according to claim 38, further satisfying the following condition:

$$1.7<r2a/r2b<2.4,$$

where r2a: the radius of curvature of the object side surface of the negative meniscus lens component in the second lens unit which is located closest to the object side;

r2b: the radius of curvature of the image side surface of the negative meniscus lens component in the second lens unit which is located closest to the object side.

43. A zoom lens according to claim 42, further satisfying the following conditions:

$$-2.3<f2/fw<-1.8$$

$$1.7<f3/fw<1.9$$

$$1.5<\Sigma d3/fw<1.84,$$

where f2: the focal length of the second lens unit;
f3: the focal length of the third lens unit;

$\Sigma d3$: the thickness of the third lens unit on the optical axis thereof.

44. A zoom lens comprising in the following order from the object side:

a first lens unit having negative refractive power and including a meniscus lens with a convex side facing the object side as the lens closest to the object side;

a second lens unit having negative refractive power and including a negative meniscus lens component with its convex side facing the object side, which is located closest to the object side, and a positive lens component which is located on the image side of the negative meniscus lens component; and a third lens unit having positive refractive power and including, in succession from the object side, two positive lens components, one negative lens component and two positive lens components;

wherein said first lens unit is fixed relative to the image plane, and said second and third lens units are moved along an optical axis to thereby vary the rear side focal length, and wherein said zoom lens satisfies the following condition:

$$0.9<f3a/f3b<1.2,$$

where f3a: the synthesized focal length of the two positive lens components disposed on the object side of the negative lens component in the third lens unit;

f3b: the synthesized focal length of the two positive lens components disposed on the image side of the negative lens component in the third lens unit.

45. A zoom lens according to claim 44 wherein, said second lens unit is moved toward the object side to thereby effect focusing from infinity to a short distance object.

46. A zoom lens according to claim 45, further satisfying the following condition:

$$0.05<fw/r1a<0.2,$$

where fw: the rear side focal length of the entire system under use;

r1a: the radius of curvature of the image side surface of that lens in the first lens unit which is most adjacent to the object side.

47. A zoom lens according to claim 46, further satisfying the following condition:

$$-2.3<f2/fw<-1.8,$$

where f2: the focal length of the second lens unit.

48. A zoom lens according to claim 47, further satisfying the following condition:

$$1.5<\Sigma d3/fw<1.8,$$

where $\Sigma d3$: the thickness of the third lens unit on the optical axis thereof.

49. A zoom lens according to claim 47, further satisfying the following condition:

$$1.7<f3/fw<1.9,$$

where f3: the focal length of the third lens unit.

50. A zoom lens according to claim 45, further satisfying the following condition:

$$1.7 < r2a/r2b < 2.4,$$

where r2a: the radius of curvature of the object side surface of the negative meniscus lens component in the second lens unit which is located closest to the object side;

r2b: the radius of curvature of the image side surface of the negative meniscus lens component in the second lens unit which is located closest to the object side.

51. A zoom lens according to claim 50, further satisfying the following conditions:

$$-2.3 < f2/fw < -1.8$$

$$1.7 < f3/fw < 1.9$$

$$1.5 < \Sigma d3/fw < 1.8,$$

where f2: the focal length of the second lens unit;

fw: the rear side focal length of the entire system under use;

f3: the focal length of the third lens unit;

$\Sigma d3$: the thickness of the third lens unit on the optical axis thereof.

52. A zoom lens according to claim 45, wherein said second lens unit includes, in succession from the object side, said negative meniscus lens component with its convex side facing the object side, a negative lens component and said positive lens component, and wherein said zoom lens further satisfies the following condition:

$$1.8 < d2c/d2d < 2.8,$$

where d2c: the on-axis air gap between the image side surface of the negative meniscus lens component in the second lens unit which is located closest to the object side and the object side surface of the lens component located on the image side of that negative meniscus lens component;

d2d: the on-axis air gap between the image side surface of the lens component in the second lens unit located on the object side of the positive lens component and the object side surface of the positive lens component.

53. A zoom lens according to claim 52, further satisfying the following condition:

$$1.7 < r2a/r2b < 2.4,$$

where r2a: the radius of curvature of the object side surface of the negative meniscus lens component in the second lens unit which is located closest to the object side;

r2b: the radius of curvature of the image side surface of the negative meniscus lens component in the second lens unit which is located closest to the object side.

54. A zoom lens according to claim 53, further satisfying the following conditions:

$$-2.3 < f2/fw < -1.8$$

$$1.7 < f3/fw < 1.9$$

$$1.5 < \Sigma d3/fw < 1.8,$$

where f2: the focal length of the second lens unit;

fw: the rear side focal length of the entire system under use;

f3: the focal length of the third lens unit;

$\Sigma d3$: the thickness of the third lens unit on the optical axis thereof.

55. A zoom lens comprising in the following order from the object side:

a first lens unit having negative refractive power and including a meniscus lens with a convex side facing the object side as the lens closest to the object side:

a second lens unit having negative refractive power and including, at least, a negative meniscus lens component with its convex side facing the object side, which is located closest to the object side, and a positive lens component which is located on the image side; and a third lens unit having positive refractive power and including, in succession from the object side, two positive lens components, one negative lens component and two positive lens components;

wherein said first lens unit is fixed relative to the image plane, and said second and third lens units are moved along an optical axis to thereby vary the rear side focal length, and wherein said zoom lens satisfies the following condition:

$$-0.8 < r3c/r3d < -0.5,$$

where r3c: the radius of curvature of the object side surface of the positive lens in the third lens unit which is disposed most adjacent to the object side;

r3d: the radius of curvature of the image side surface of the positive lens in the third lens unit which is disposed most adjacent to the object side.

56. A zoom lens according to claim 55, wherein said second lens unit is moved toward the object side to thereby effect focusing from infinity to a short distance object.

57. A zoom lens according to claim 56, further satisfying the following condition:

$$0.05 < fw/r1a < 0.2,$$

where fw: the rear side focal length of the entire system under use;

r1a: the radius of curvature of the image side surface of that lens in the first lens unit which is most adjacent to the object side.

58. A zoom lens according to claim 57, further satisfying the following condition:

$$-2.3 < f2/fw < -1.8,$$

where f2: the focal length of the second lens unit.

59. A zoom lens according to claim 58, further satisfying the following condition:

$$1.5 < \Sigma d3/fw < 1.8,$$

where $\Sigma d3$: the thickness of the third lens unit on the optical axis thereof.

60. A zoom lens according to claim 58, further satisfying the following condition:

$1.7 < f3/fw < 1.9$, where f3: the focal length of the third lens unit.

61. A zoom lens according to claim 57, further satisfying the following condition:

$1.7 < r2a/r2b < 2.4$, where r2a: the radius of curvature of the object side surface of the negative meniscus lens component in the second lens unit which is located closest to the object side;

r2b: the radius of curvature of the image side surface of the negative meniscus lens component in the second lens unit which is located closest to the object side.

62. A zoom lens according to claim 61, further satisfying the following conditions:

$-2.3 < f2/fw < -1.8$ $1.7 < f3/fw < 1.9$ $1.5 < \Sigma d3/fw < 1.8$, where f2: the focal length of the second lens unit;

f3: the focal length of the third lens unit;

$\Sigma d3$: the thickness of the third lens unit on the optical axis thereof.

63. A zoom lens according to claim 61, wherein said second lens unit includes, in succession from the object side, said negative meniscus lens component with its convex side facing the object side, a negative lens component and said positive lens component, and wherein said zoom lens further satisfies the following condition:

$1.8 < d2c/d2d < 2.8$, where d2c: the on-axis air gap between the image side surface of the negative meniscus lens component in the second lens unit which is located closest to the object side and the object side surface of the lens component located on the image side of that negative meniscus lens component;

d2d: the on-axis air gap between the image side surface of the lens component in the second lens unit located on the object side of the positive lens component and the object side surface of the positive lens component.

64. A zoom lens according to claim 63, further satisfying the following condition:

$0.9 < f3a/f3b < 1.2$, where f3a: the synthesized focal length of the two positive lens components disposed on the object side of the negative lens component in the third lens unit;

f3b: the synthesized focal length of the two positive lens components disposed on the image side of the negative lens component in the third lens unit.

65. A zoom lens according to claim 64, further satisfying the following conditions:

$-2.3 < f2/fw < -1.8$ $1.7 < f3/fw < 1.9$ $1.5 < \Sigma d3/fw < 1.8$, where f2: the focal length of the second lens unit;

f3: the focal length of the third lens unit;

$\Sigma d3$: the thickness of the third lens unit on the optical axis thereof.

66. A zoom lens comprising in the following order from the object side:

a first lens unit having negative refractive power and including a meniscus lens with a convex side facing the object side as the lens closest to the object side;

a second lens unit having negative refractive power and including, at least, a negative meniscus lens component with its convex side facing the object side, which is located closest to the object side, and a positive lens component which is located on the image side; and a third lens unit having positive refractive power and including in succession from the object side, two positive lens components, one negative lens component and two positive lens components;

wherein said first lens unit is fixed relative to the image plane, and said second and third lens units are moved along an optical axis to thereby vary the rear side focal length, and wherein said zoom lens satisfies the following condition:

$-1.0 \leq r3e/r3f < -0.6$, where r3e: the radius of curvature of the object side surface of the negative lens component in the third lens unit;

r3f: the radius of curvature of the image side surface of the negative lens component in the third lens unit.

67. A zoom lens according to claim 66, wherein said second lens unit is moved toward the object side to thereby effect focusing from infinity to a short distance object.

68. A zoom lens according to claim 67, further satisfying the following condition:

$0.05 < fw/r1a < 0.2$, where fw: the rear side focal length of the entire system under use;

r1a: the radius of curvature of the image side surface of that lens in the first lens unit which is most adjacent to the object side.

69. A zoom lens according to claim 68, further satisfying the following condition:

$-2.3 < f2/fw < -1.8$, where f2: the focal length of the second lens unit.

70. A zoom lens according to claim 69, further satisfying the following condition:

$1.5 < \Sigma d3/fw < 1.8$, where $\Sigma d3$: the thickness of the third lens unit on the optical axis thereof.

71. A zoom lens according to claim 69, further satisfying the following condition:

$$1.7 < f3/fw < 1.9,$$

where f3: the focal length of the third lens unit.

72. A zoom lens according to claim 68, further satisfying the following condition:

$$1.7 < r2a/r2b < 2.4,$$

where r2a: the radius of curvature of the object side surface of the negative meniscus lens component in the second lens unit which is located closest to the object side;

r2b: the radius of curvature of the image side surface of the negative meniscus lens component in the second lens unit which is located closest to the object side.

73. A zoom lens according to claim 72, further satisfying the following conditions:

$$-2.3 < f2/fw < -1.8$$

$$1.7 < f3/fw < 1.9$$

$$1.5 < \Sigma d3/fw < 1.8,$$

where f2: the focal length of the second lens unit;

f3: the focal length of the third lens unit;

Σd3: the thickness of the third lens unit on the optical axis thereof.

74. A zoom lens according to claim 72, wherein said second lens unit includes, in succession from the object side, said negative meniscus lens component with its convex side facing the object side, a negative lens component, and said positive lens component, and wherein said zoom lens further satisfies the following condition:

$$1.8 < d2c/d2d < 2.8,$$

where d2c: the on-axis air gap between the image side surface of the negative meniscus lens component in the second lens unit which is located closest to the object side and the object side surface of the lens component located on the image side of that negative meniscus lens component;

d2d: the on-axis air gap between the image side surface of the lens component in the second lens unit located on the object side of the positive lens component and the object side surface of the positive lens component.

75. A zoom lens according to claim 74, further satisfying the following conditions:

$$0.9 < f3a/f3b < 1.2$$

$$-0.8 < r3c/r3d < -0.5,$$

where f3a: the synthesized focal length of the two positive lens components disposed on the object side of the negative lens component in the third lens unit;

f3b: the synthesized focal length of the two positive lens components disposed on the image side of the negative lens component in the third lens unit;

r3c: the radius of curvature of the object side surface of the positive lens component in the third lens unit which is disposed most adjacent to the object side;

r3d: the radius of curvature of the image side surface of the positive lens component in the third lens unit which is disposed most adjacent to the object side.

76. A zoom lens according to claim 75, further satisfying the following conditions:

$$-2.3 < f2/fw < -1.8$$

$$1.7 < f3/fw < 1.9$$

$$1.5 < \Sigma d3/fw < 1.8,$$

where f2: the focal length of the second lens unit;

f3: the focal length of the third lens unit;

Σd3: the thickness of the third lens unit on the optical axis thereof.

77. A zoom lens comprising in the following order from the object side:

a first lens unit having negative refractive power and including a meniscus lens with a convex side facing the object side as the lens closest to the object side;

a second lens unit having negative refractive power and including, at least, a negative meniscus lens component with its convex side facing the object side, which is located closest to the object side, and a positive lens component which is located on the image side; and a third lens unit having positive refractive power and including in succession from the object side, two positive lens components, one negative lens component and two positive lens components;

wherein said first lens unit is fixed relative to the image plane, and said second and third lens units are moved along an optical axis to thereby vary the rear side focal length, and wherein said zoom lens satisfies the following condition:

$$-0.2 < r3h/r3g < 0,$$

where r3g: the radius of curvature of the object side surface of the positive lens component in the third lens unit which is disposed most adjacent to the image side;

r3h: the radius of curvature of the image side surface of the positive lens component in the third lens unit which is disposed most adjacent to the image side.

78. A zoom lens according to claim 77, wherein said second lens unit is moved toward the object side to thereby effect focusing from infinity to a short distance object.

79. A zoom lens according to claim 78, further satisfying the following condition:

$$0.05 < fw/r1a < 0.2,$$

where fw: the rear side focal length of the entire system under use;

r1a: the radius of curvature of the image side surface of that lens in the first lens unit which is most adjacent to the object side.

80. A zoom lens according to claim 79, further satisfying the following condition:

$$-2.3 < f2/fw < -1.8,$$

where f2: the focal length of the second lens unit.

81. A zoom lens according to claim 80, further satisfying the following condition:

$$1.5 < \Sigma d3/fw < 1.8,$$

where $\Sigma d3$: the thickness of the third lens unit on the optical axis thereof.

82. A zoom lens according to claim 80, further satisfying the following condition:

$$1.7 < f3/fw < 1.9,$$

where f3: the focal length of the third lens unit.

83. A zoom lens according to claim 79, further satisfying the following conditions:

$$0.9 \, f3a/f3b < 1.2$$

$$-0.8 < r3c/r3d < -0.5$$

$$-1.0 \leq r3e/r3f < -0.6,$$

where f3a: the synthesized focal length of the two positive lens components disposed on the object side of the negative lens component in the third lens unit;

f3b: the synthesized focal length of the two positive lens components disposed on the image side of the negative lens component in the third lens unit;

r3c: the radius of curvature of the object side surface of the positive lens component in the third lens unit which is disposed most adjacent to the object side;

r3d: the radius of curvature of the image side surface of the positive lens component in the third lens unit which is disposed most adjacent to the object side;

r3e: the radius of curvature of the object side surface of the negative lens component in the third lens unit;

r3f: the radius of curvature of the image side surface of the negative lens component in the third lens unit.

84. A zoom lens according to claim 83, further satisfying the following conditions:

$$-2.3 < f2/fw < -1.8$$

$$1.7 < f3/fw < 1.9$$

$$1.5 < \Sigma d3/fw < 1.8,$$

where f2: the focal length of the second lens unit;

f3: the focal length of the third lens unit;

pd3: the thickness of the third lens unit on the optical axis thereof.

85. A zoom lens according to claim 83, wherein said second lens unit includes, in succession from the object side, said negative meniscus lens component with its convex side facing the object side, a negative lens component and said positive lens component, and wherein said zoom lens further satisfies the following conditions:

$$1.7 < r2a/r2b < 2.4$$

$$1.8 < d2c/d2d < 2.8,$$

where r2a: the radius of curvature of the object side surface of the negative meniscus lens component in the second lens unit which is located closest to the object side;

r2b: the radius of curvature of the image side surface of the negative meniscus lens component in the second lens unit which is located closest to the object side;

d2c: the on-axis air gap between the image side surface of the negative meniscus lens component in the second lens unit which is located closest to the object side and the object side surface of the lens component located on the image side of that negative meniscus lens component;

d2d: the on-axis air gap between the image side surface of the lens component in the second lens unit located on the object side of the positive lens component and the object side surface of the positive lens component.

86. A zoom lens according to claim 85, further satisfying the following conditions:

$$-2.3 < f2/fw < -1.8$$

$$1.7 < f3/fw < 1.9$$

$$1.5 < \Sigma d3/fw < 1.8,$$

where f2: the focal length of the second lens unit;

f3: the focal length of the third lens unit;

$\Sigma d3$: the thickness of the third lens unit on the optical axis thereof.

\* \* \* \* \*